US008014558B2

(12) United States Patent
Cooper et al.

(10) Patent No.: US 8,014,558 B2
(45) Date of Patent: Sep. 6, 2011

(54) METHODS, APPARATUS AND SYSTEM FOR FILM GRAIN SIMULATION

(75) Inventors: Jeffrey Allen Cooper, Rocky Hill, NJ (US); Joan Llach, Princeton, NJ (US); Cristina Gomila, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1577 days.

(21) Appl. No.: 11/246,474

(22) Filed: Oct. 7, 2005

(65) Prior Publication Data
US 2006/0083314 A1    Apr. 20, 2006

Related U.S. Application Data

(60) Provisional application No. 60/619,632, filed on Oct. 18, 2004.

(51) Int. Cl.
*G06K 9/00* (2006.01)
(52) U.S. Cl. .................. 382/100; 382/284; 382/305
(58) Field of Classification Search .............. 382/100, 382/284, 254, 274–275, 305, 232–253, 260; 348/96–97, 239, 446, 441; 375/240.01–240.29; 358/3.26–3.28, 537–540, 527; 430/21
See application file for complete search history.

(56) References Cited

U.S. PATENT DOCUMENTS

| | | | |
|---|---|---|---|
| 4,935,816 A | 6/1990 | Faber | |
| 5,140,414 A | 8/1992 | Mowry | |
| 5,335,013 A | 8/1994 | Faber | |
| 5,374,954 A | 12/1994 | Mowry | |
| 5,406,326 A | 4/1995 | Mowry | |
| 5,457,491 A | 10/1995 | Mowry | |
| 5,471,572 A | 11/1995 | Buchner et al. | |
| 5,475,425 A | 12/1995 | Przyborski et al. | |
| 5,629,769 A | 5/1997 | Cookingham et al. | |
| 5,641,596 A * | 6/1997 | Gray et al. .................. 430/21 |
| 5,687,011 A | 11/1997 | Mowry | |

(Continued)

FOREIGN PATENT DOCUMENTS

EP    0622000    3/2000

(Continued)

OTHER PUBLICATIONS

Office Action from U.S. Appl. No. 10/556,834 mailed Aug. 19, 2008.

(Continued)

*Primary Examiner* — Sherali Ishrat
(74) *Attorney, Agent, or Firm* — Robert D. Shedd; Robert B. Levy; Jorge Tony Villabon

(57) ABSTRACT

The present invention provides a method, apparatus and system for providing fast access to film grain patterns in a film grain simulation process including providing a first memory storing at least one film grain pattern and in response to a film grain pattern required by the film grain simulation process not being stored in the first memory, updating the first memory to obtain at least the required film grain pattern from at least a second memory. In one embodiment, the first memory is a local cache, the second memory is a film grain pattern database and a controller causes the examination of the local cache for a particular film grain pattern required in the film grain simulation process. In response to the required film grain pattern not being stored in the local cache, the controller causes the update of the local cache using the film grain pattern database.

21 Claims, 3 Drawing Sheets

U.S. PATENT DOCUMENTS

| | | | |
|---|---|---|---|
| 5,709,972 A | 1/1998 | Cookingham et al. | |
| 5,767,860 A | 6/1998 | Zimmer et al. | |
| 5,831,673 A * | 11/1998 | Przyborski et al. | 348/239 |
| 6,441,918 B1 | 8/2002 | Hori | |
| 6,665,369 B2 | 12/2003 | Ukita et al. | |
| 7,065,255 B2 * | 6/2006 | Chen et al. | 382/260 |
| 2002/0034337 A1 | 3/2002 | Shekter | |

FOREIGN PATENT DOCUMENTS

| | | |
|---|---|---|
| EP | 1175091 | 1/2002 |
| EP | 1215624 | 6/2002 |
| JP | 2003-24326 | 1/2003 |
| WO | WO9314591 | 7/1993 |
| WO | WO9722204 | 6/1997 |
| WO | WO0146992 | 6/2001 |
| WO | WO0177871 | 10/2001 |
| WO | WO03005731 | 1/2003 |
| WO | WO2004104931 | 12/2004 |
| WO | WO 2005/027045 | 3/2005 |

OTHER PUBLICATIONS

Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
McLean, I, et al., "Telecine Noise Reduction", IEE Seminar Digital Restoration of Film and Video Archives (Ref. No. 01/049), IEE Seminar Digital Restoration of Film and Video Archives, London, UK. Jan. 16, 2001, pp. 2/1-2/6.
Yan, Jacky Chun Kit, et al. "Film Grain Noise Removal and Generation for Color Images", 1997 IEEE Signal Processing Workshop on Higher-Order Statistics, Jul. 21-23, Banff, Alberta, Canada. pp. 73-76.
Yan, Jacky Chun Kit, et al. "Signal Dependent Film Grain Noise Removal and Generation Based on Higher-Order Statistics", 1997 IEEE Signal Processing Workshop on Higher-Order Statistics, Jul. 21-23, Banff, Alberta, Canada. pp. 77-81.
Al-Shaykh, Osama K., et al., "Restoration of Lossy Compressed Noisy Images", IEEE Transactions of Image Processing, vol. 8. No. 10, pp. 1348-1360, Oct. 1999.
Al-Shaykh, Osama K, et al. "Lossy Compression of Images Corrupted by Film Grain Noise", Proceedings International Conference on Image Processing, Sep. 16-19, 1996, Lausanne, Switzerland vol. I of III, pp. 805-808.
Campisi, P, et al. "Signal-dependent film grain noise generation using homomorphic adaptive filtering.", IEE Proceedings Vision, Image and Signal Processing, vol. 147, No. 3 pp. 283-287 Jun. 2000.
Yoshida, J, "Go with the Grain, Film R&D Chief Urges, for Art's Sake", EETimes, http://www.eetimes.com/showArticle.jhtml?articleID=59301182 (last checked Jul. 23, 2007).
Zhao, Lifeng, et al., "Constant Quality Rate Control for Streaming MPEG-4 FGS Video", IEEE, 2002, pp. 544-547.
Al-Shaykh, Osama K, et al., "Lossy Compression of Noisy Images", IEEE Transactions on Image Processing vol. 7, No. 12, Dec. 1998, pp. 1641-1652.
Brightwell, PJ, et al., "Automated Correction of Film Unsteadiness, Dirt and Grain", International Broadcasting Convention, Sep. 16-20, 1994 Conference Publication, No. 397.
Oktem, R, et al., "Transform Domain Algorithm for Reducing Effect of Film Grain Noise in Image Compression", Electronics Letters, vol. 35, No. 21, Oct. 14, 1999, pp. 1830-1831.
Fischer, Marco, et al., "Image Sharpening Using Permutation Weighted Medians", Dept of Electrical Engineering, University of Delware Newark, DE, pp. 1-4.
Shahnaz, Rubeena, et al., "Image Compression in Signal-Dependent Noise", Applied Optics, vol. 38, No. 26, Sep. 10, 1999, pp. 5560-5567.
Chavel, P., et al., "Film Grain Noise in Partially Coherent Imaging", Optical Engineering, vol. 19, No. 3, May/Jun. 1980, pp. 404-410.
Zhang, Xi Min, et al., "Constant Quality Constrained Rate Allocation for FGS Video Coded Bitstreams", Proceedings of SPIE, vol. 4671, pp. 817-827, 2002.
Peng, Sharon, et al., Adaptive Frequency Weighting for Fine-Granularity-Scalability, Proceedings of SPIE, vol. 4671, pp. 840-849, 2002.
Van Der Schaar, M., et al., "Fine-Granularity for Wireless Video and Scalable Storage", Proceedings of SPIE vol. 4671, pp. 805-816, 2002.
Prades-Nebot, Josep, et al., "Rate Control for Fully Fine Grained Scalable Video Coders", Proceedings of SPIE, vol. 4671, pp. 828-839, 2002.
Yan, Rong, et al., "Efficient Video Coding with Hybrid Spatial and Fine Grain SNR Scalabilities", Proceedings of SPIE vol. 4671, pp. 850-859, 2002.
Cristina Gomila, "SEI message for film grain encoding", Joint Video Team (JVT) of ISO/IEC MPEG & ITU-T VCEG, May 2003, pp. 1-14, Geneva, CH.
Schlockermann, M. et al., "Film Grain Coding in H.264/AVC", Joint Video Team (JVT) of ISO/IEC MPEG & ITU-T VCEG (ISO/IEC JTC1/SC291WG11 and ITU-T SG16 Q6), Sep. 2, 2003, pp. 1-8.

* cited by examiner

112

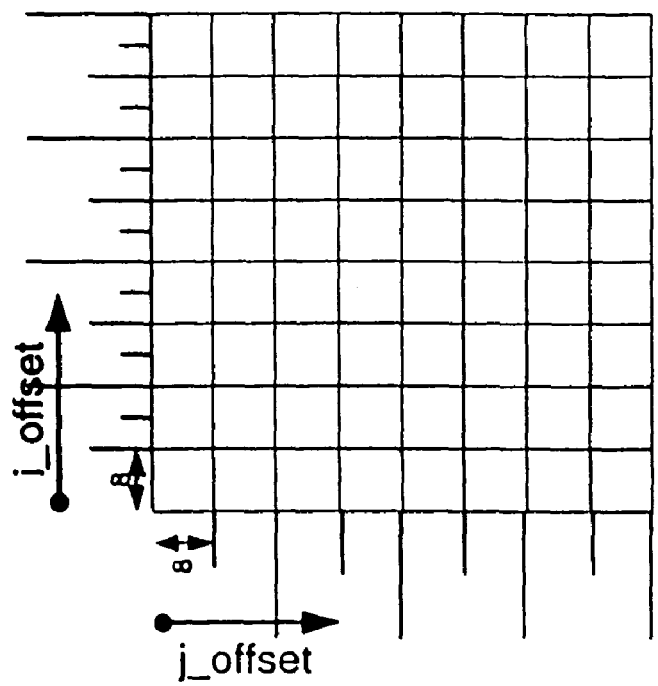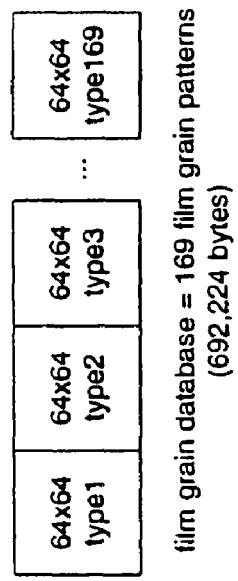
FIG 3

METHODS, APPARATUS AND SYSTEM FOR FILM GRAIN SIMULATION

CROSS-REFERENCE TO RELATED APPLICATIONS

This application claims priority to U.S. Provisional Patent Application Ser. No. 60/619,632, filed Oct. 18, 2004, which is herein incorporated by reference in its entirety.

FIELD OF THE INVENTION

The present invention generally relates to film grain simulation and, more particularly, to methods and system for efficient, low-cost film grain simulation implementations.

BACKGROUND OF THE INVENTION

Film grain forms in motion picture images during the process of development. Film grain is clearly noticeable in HD images and becomes a distinctive cinema trait that is becoming more desirable to preserve through the whole image processing and delivery chain. Nevertheless, film grain preservation is a challenge for current encoders since compression gains related to temporal prediction cannot be exploited. Because of the random nature of the grain, visually lossless encoding is only achieved at very high bit-rates. Lossy encoders tend to suppress the film grain when filtering the high frequencies typically associated with noise and fine textures.

In the recently created H.264 I MPEG-4 AVC video compression standard, and in particular in its Fidelity Range Extensions (FRExt) Amendment 1 (JVT-K051, ITU-T Recommendation H.264 I ISO/IEC 14496-10 International Standard with Amendment 1, Redmond, USA, June 2004), a film grain Supplemental Enhancement Information (SEI) message has been defined. Such a message describes the film grain characteristics regarding attributes like size and intensity, and allows a video decoder to simulate the film grain look onto a decoded picture. The H.264 I MPEG-4 AVC standard specifies which parameters are present in the film grain SEI message, how to interpret them and the syntax to be used to encode the SEI message in binary format. The standard does not specify, however, the exact procedure to simulate film grain upon reception of the film grain SEI message.

Film grain simulation is a relatively new technology used in post-production to simulate film grain on computer-generated material, as well as during restoration of old film stocks. For this kind of applications, there exists commercial software in the market like Cineon®, from Eastman Kodak Co, Rochester, N.Y., and Grain Surgery™, from Visual Infinity. These tools require user interaction and are complex to implement, which makes them unsuitable for real-time video coding applications. Furthermore, none of these tools has the capability to interpret a film grain SEI message as specified by the H.264/AVC video coding standard.

SUMMARY OF THE INVENTION

The present invention advantageously provides methods and systems for efficient, low-cost film grain simulation implementations.

In one embodiment of the present invention a method for providing fast access to film grain patterns in a film grain simulation process includes providing a cache having at least a subset of a total number of film grain patterns able to be implemented in the film grain simulation process and in response to a film grain pattern required in the film grain simulation process not being included in the local cache, updating the local cache to contain at least the required film grain pattern using at least one database containing at least the required film grain pattern.

In an alternate embodiment of the present invention, an apparatus for simulating film grain includes a means for receiving at least an encoded image and supplemental information including film grain characterization information for use in a film grain simulation process, a first storage means including at least one film grain pattern, a controller, including a memory for storing instructions and a processor for performing the instructions. The controller is adapted to perform the steps of determining if a film grain pattern required in the film grain simulation process exists in the first storage means and in response to a film grain pattern required in the film grain simulation process not being included in the first storage means, updating the first storage means to contain at least the required film grain pattern using at least a second storage means.

BRIEF DESCRIPTION OF THE DRAWINGS

The teachings of the present invention can be readily understood by considering the following detailed description in conjunction with the accompanying drawings, in which:

FIG. 3 depicts a high level block diagram of a typical arrangement of the film grain database of FIG. 1.

Figure 1:
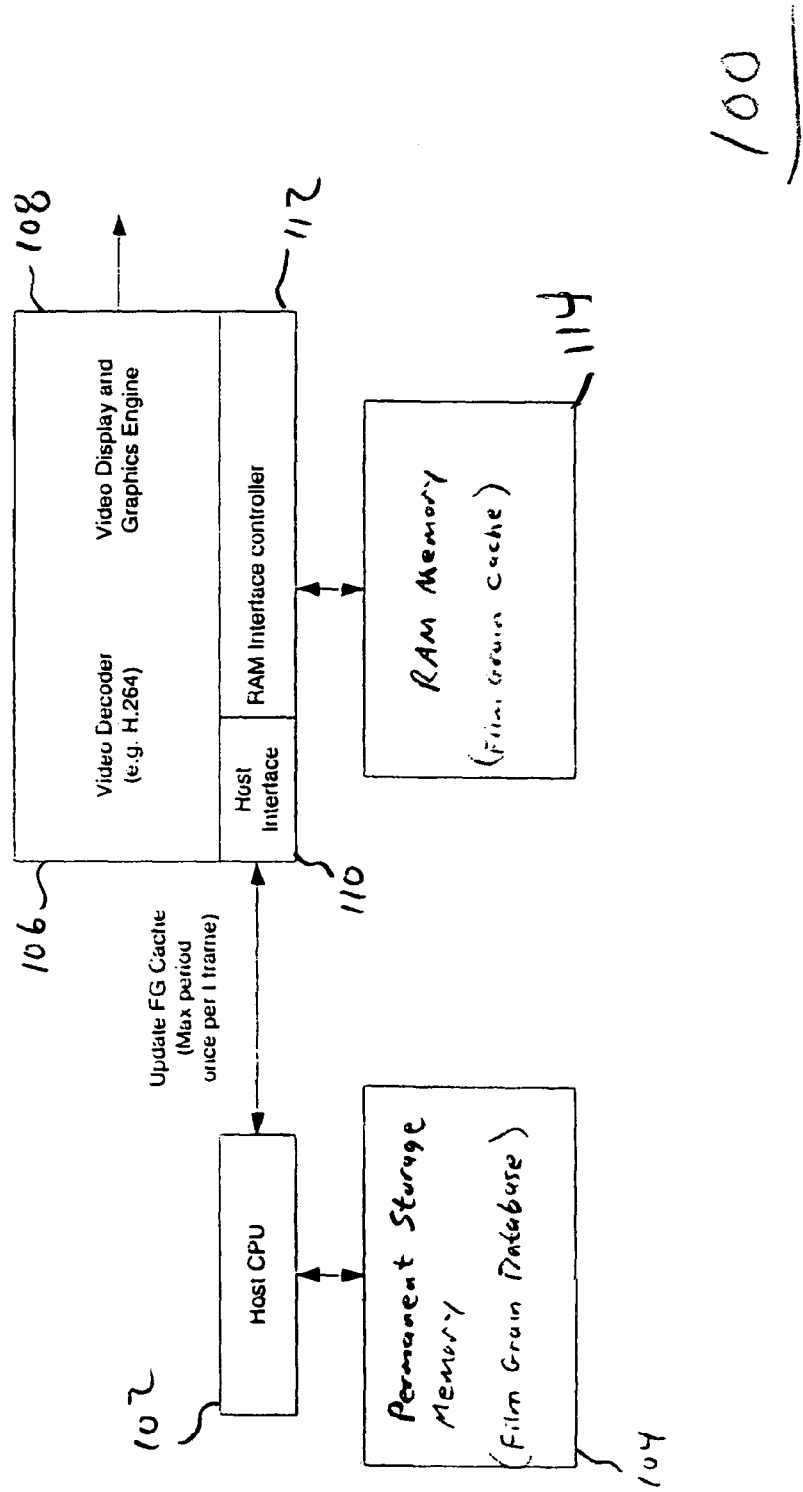
FIG. 1 depicts a high level block diagram of a video decoder subsystem having film grain simulation capabilities in accordance with one embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides methods and systems for efficient, low-cost film grain simulation implementations. Although the present invention will be described primarily within the context of a video decoder subsystem for application in, for example, IC designs for consumer HD DVD players, the specific embodiments of the present invention should not be treated as limiting the scope of the invention. It will be appreciated by those skilled in the art and informed by the teachings of the present invention that the concepts of the present invention can be advantageously applied in any film grain simulation processes in, for example, media player/receiver devices, decoders, set-top boxes, television sets or the like.

FIG. 1 depicts a high level block diagram of a video decoder subsystem having film grain simulation capabilities in accordance with one embodiment of the present invention. The video decoder subsystem 100 of FIG. 1 illustratively comprises a video decoder (illustratively a H.264 decoder) 106, a video display and graphics engine 108, a host interface 110, an interface controller (illustratively a RAM interface controller) 112, and a memory (illustratively a local Ram memory) 114 implemented as a film grain cache for storing a small subset of the film grain patterns in the remote film grain database 104. FIG. 1 further depicts a host CPU 102 and a permanent storage program memory (illustratively a remote permanent storage memory) 104 comprising a film grain database. Although in the video decoder subsystem 100 of FIG. 1, the host CPU 102 and the remote film grain database 104 are depicted as comprising separate components, in alternate embodiments of the present invention, the remote film grain database 104 can be located in a permanent memory of the CPU 102. Furthermore, although in the video decoder subsystem 100 of FIG. 1, the video decoder 106, the video display and graphics engine 108, the host interface 100, and the interface controller 112 are depicted as comprising separate components, in alternate embodiments of the present invention, the video decoder 106, the video display and graphics engine 108, the host interface 100, and the interface controller 112 can comprise a single component and can be integrated in a single integrated system-on-chip (SoC).

Furthermore, although in the video decoder subsystem 100 of FIG. 1, the means for storing the film grain patterns are depicted as a local Ram memory 114 (cache) and a remote film grain database 104, in alternate embodiments of the present invention, substantially any accessible storage means may be implemented to maintain a subset of the film grain patterns and the total number of film grain patterns. Such means may include storage disks, magnetic storage media, optical storage media or substantially any storage means. In addition, one or more storage means may be implemented for each of the storage devices. Even further, although the film grain database 104 of FIG. 1 is depicted as being located remotely from the Ram memory 114, in alternate embodiments of the present invention, the film grain patterns storage means may be located in close proximity or at great distances from each other.

Figure 2:
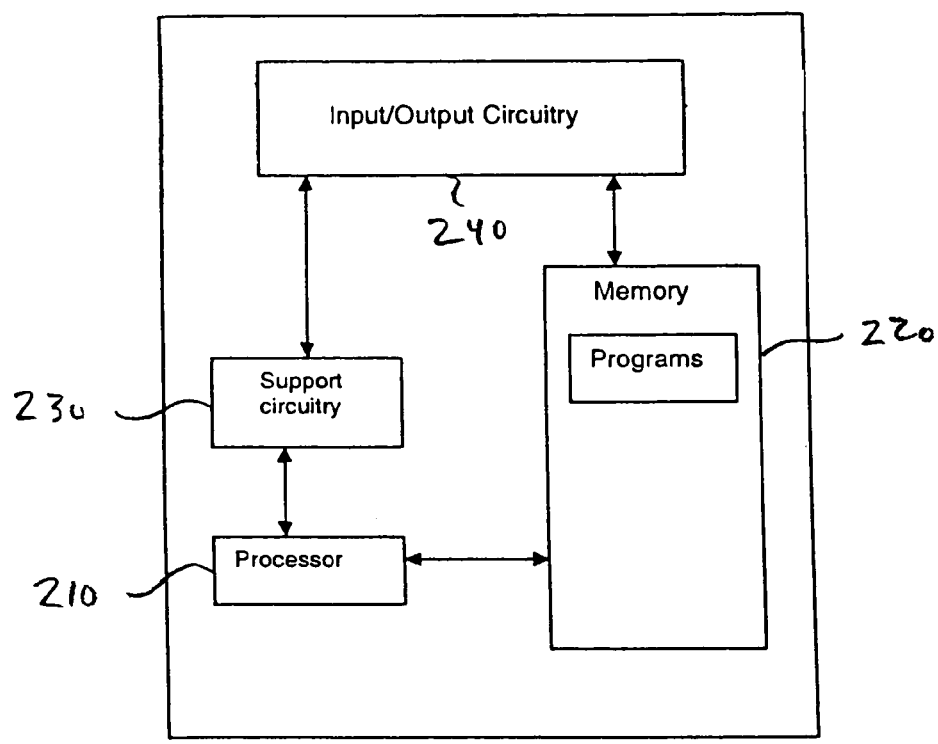
FIG. 2 depicts a high level block diagram of an embodiment of a RAM interface controller suitable for use in the video decoder subsystem of FIG. 1.

FIG. 2 depicts a high level block diagram of an embodiment of a RAM interface controller suitable for use in the video decoder subsystem 100 of FIG. 1. The RAM interface controller 112 of FIG. 2 comprises a processor 210 as well as a memory 220 for storing control programs, algorithms and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The RAM interface controller 112 also contains input-output circuitry 240 that forms an interface between the various respective functional elements communicating with the RAM interface controller 112.

Although the RAM interface controller 112 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Referring back to the subsystem 100 of FIG. 1, the remote film grain database 104 is typically relatively large. In one embodiment of the present invention, the H.264 video decoder 106, the video display and graphics engine 108, the host interface 110, the interface controller 112, and the local memory 114 comprise components of an HD DVD player. Film grain patterns from the remote film grain database 104 are needed to be accessed at the sample rate of, for example, the HD DVD player. Therefore, fast access to the large film grain database 104 is necessary. In the subsystem 100 of FIG. 1 in accordance with the present invention, only a small portion of the remote film grain database 104 is used during Supplemental Enhancement Information (SEI) film grain periods, which are leveraged to develop a caching technique to reduce complexity.

More specifically, the film grain simulation process of FIG. 1 requires the decoding of film grain SEI messages, conveyed in the International Standard ITU-T Rec. H.264 I ISO/IEC 14496-10 bit-streams as specified by Amendment 1 (Fidelity Range Extensions), which are both herein included by reference in their entireties. In one embodiment of the present invention, film grain SEI messages are sent preceding I (intra-coded) pictures, and only one film grain SEI message precedes a particular I picture.

In one embodiment of the present invention and in accordance with the standards specifications, the remote film grain database 104 of film grain patterns is composed of 169 patterns of 4,096 film grain samples, each representing a 64×64 film grain image. For example, FIG. 3 depicts a high level block diagram of a typical arrangement of the film grain database of FIG. 1. FIG. 3 depicts a 64×64 sample film grain pattern with i_offset in the x-axis and j_offset in the y-axis. FIG. 3 further depicts the 169 film grain patterns of the various types.

In the film grain database 104, each film grain pattern is synthesized using a different pair of cut frequencies according to a frequency filtering model of the standard specifications. The cut frequencies transmitted in the SEI message are used to access the remote film grain database 104 of film grain patterns during the film grain simulation process. The film grain database 104 is stored in ROM, Flash, or other permanent storage device, such as the film grain database 104 of the video decoder subsystem 100 of FIG. 1, and typically does not change. The film grain database 104 contains random film grain patterns in a very large variety of film grain shapes and sizes. However, for a specific video content sequence only a small subset of this database is actually needed to effectively simulate film grain. The specification limits the number of film grain patterns to a small subset for any SEI message period. Therefore, the present invention implements a small film grain cache, such as the local Ram memory 114, which is updated on receipt of SEI messages.

Typically, the remote film grain database 104 is stored in the permanent storage of the host CPU 102 or at the site of the host CPU 102. However, it is the video decoder 106 and the video display and graphics engine 108 that need fast access to the film grain database 104. As such, and in accordance with the present invention, the local memory 114 is provided for fast access to at least a subset of the film grain patterns. That is, at least a small subset of the film grain patterns needed or most implemented by the existing SEI message period is transferred to and stored in the local memory 114.

In one embodiment of the present invention, the local memory 114 is large enough to store the entire film grain database 104. In such an embodiment, the video decoder 106 and the video display and graphics engine 108 have immediate and fast access, via the interface controller 112, to all of the available film grain patterns originally stored in the remote film grain database 104. In addition, such an embodiment of the present invention has the advantage that the film grain cache in the local memory 114 does not have to be updated on receipt of an SEI message. Such an embodiment, however, has the disadvantage that more memory is required. In some implementations, however, such large memory (Ram) space is already available.

In an alternate embodiment of the present invention, the local memory 114 is only large enough to store a subset of the film grain database 104. In such an embodiment, on each receipt of an SEI message, the controller 112 initiates an examination of the cache of the local memory 114 to determine if any of the subset of film grain patterns already in the local memory 114 needs to be replaced with different film grain patterns in the remote film grain database 104 selected in the new SEI message. An advantage of this technique is a smaller local memory 114 allocation. A disadvantage is that the cache of the local memory 114 must be managed by the controller 112, and in the worst case, a full cache size must be transferred from the remote film grain database 104 to the local memory 114 for each I frame via, for example, the controller 112. In addition, in such an embodiment of the present invention, on device boot up (or reset), the local memory 114 (i.e., the film grain cache) can be pre-initialized by the controller 112 with the most common film grain patterns stored in the remote film grain database 104. That is, the selection of which film grain patterns to store in the local memory 114 depends on empirical data based on what film grain patterns in the film grain database 104 were most often used across a wide selection of film content.

In any event, in the above described embodiments of the present invention, the local memory 114 in accordance with the present invention, in conjunction with the controller 112, enable the video decoder 106 and the video display and graphics engine 108 faster access to the film grain patterns previously only contained in the remote film grain database 104.

Having described various embodiments for methods, apparatus and systems for film grain simulation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for providing fast access to film grain patterns in a film grain simulation process, comprising:
   providing a first memory for storing at least one film grain pattern; and
   in response to a film grain pattern required by said film grain simulation process not being stored in said first memory, updating said first memory to obtain at least the required film grain pattern from at least a second memory.

2. The method of claim 1, wherein said first memory is local to a location of the film grain simulation process.

3. The method of claim 1, wherein said second memory is located at a remote location from a location of the film grain simulation process.

4. The method of claim 1, wherein said first memory stores at least film grain patterns most commonly implemented in said film grain simulation process.

5. The method of claim 1, wherein said second memory stores all film grain patterns able to be implemented in said film grain simulation process.

6. The method of claim 1, wherein said first memory is a primary source for film grain patterns during said film grain simulation process.

7. A method for providing fast access to film grain patterns in a film grain simulation process, comprising:
   providing a cache, local to a location of the film grain simulation process, for storing at least a subset of a total number of film grain patterns able to be implemented in said film grain simulation process; and
   in response to a film grain pattern required in said film grain simulation process not being stored in said local cache, updating said local cache to obtain at least the required film grain pattern from at least one database containing at least the required film grain pattern.

8. The method of claim 7, wherein said at least one database contains a total number of film grain patterns able to be implemented in said film grain simulation process.

9. The method of claim 7, wherein said subset of film grain patterns in said local cache includes film grain patterns from said at least one database most commonly implemented in said film grain simulation process.

10. The method of claim 7, wherein a supplemental information message identifies film grain patterns required in said film grain simulation process.

11. The method of claim 10, wherein said supplemental information message comprises a Supplemental Enhancement Information (SEI) Message.

12. An apparatus for simulating film grain, comprising:
   a means for receiving at least an encoded image and supplemental information including film grain characterization information for use in a film grain simulation process;
   a first storage means for storing at least one film grain pattern;
   a controller, said controller adapted to perform the steps of:
      determining if a film grain pattern required in said film grain simulation process is stored in said first storage means; and
      in response to a film grain pattern required in said film grain simulation process not being stored in said first storage means, updating said first storage means to obtain at least the required film grain pattern from at least a second storage means.

13. The apparatus of claim 12, wherein said means for receiving comprises a decoder.

14. The apparatus of claim 12, wherein said first storage means comprises a local cache.

15. The apparatus of claim 12, wherein said second storage means comprises a remote database.

16. The apparatus of claim 12, wherein said controller comprises a random access memory (RAM) interface controller.

17. The apparatus of claim 12, wherein said first storage means includes at least film grain patterns most commonly implemented in said film grain simulation process.

18. The apparatus of claim 12, wherein said second storage means contains all film grain patterns required in said film grain simulation process.

19. The apparatus of claim 12, wherein said determining occurs in response to receiving a supplemental information message, said supplemental information message identifying at least one film grain pattern required in said film grain simulation process.

20. A system for simulating film grain, comprising:
   a means for receiving at least an encoded image and supplemental information including film grain characterization information for use in a film grain simulation process;
   a first storage means for storing at least one film grain pattern;
   a second storage means for storing film grain patterns to be used in said film grain simulation process;

a controller, including a memory for storing at least instructions and a processor for performing said instructions, said controller adapted to perform the steps of:
 determining if a film grain pattern required in said film grain simulation process is stored in said first storage means; and
 in response to a film grain pattern required in said film grain simulation process not being stored in said first storage means, causing said first storage means to obtain at least the required film grain pattern from said second storage means.

21. A system for simulating film grain, comprising:
a decoder for receiving at least an encoded image and a supplemental information message including film grain characterization information for use in a film grain simulation process;
a local database storing at least a subset of a total number of film grain patterns to be use in said film grain simulation process;
a remote database storing a total number of film grain patterns to be used in said film grain simulation process;
an interface controller, including at least a memory for storing instructions and a processor for performing said instructions, said interface controller adapted to perform the steps of:
 in response to a received supplemental information message, determining if a film grain pattern required by said film grain simulation process is stored in said local database; and
 in response to a film grain pattern identified by said supplemental information message not being stored in said local database, updating said local database to obtain at least the identified film grain pattern from at least said remote database.

* * * * *